(12) United States Patent
Maiya

(10) Patent No.: US 9,019,361 B2
(45) Date of Patent: Apr. 28, 2015

(54) MICROSCOPE APPARATUS AND CONTROL METHOD

(75) Inventor: Nobuhiko Maiya, Yokohama (JP)

(73) Assignee: Nikon Corporation, Tokyo (JP)

( * ) Notice: Subject to any disclaimer, the term of this patent is extended or adjusted under 35 U.S.C. 154(b) by 660 days.

(21) Appl. No.: 13/415,020

(22) Filed: Mar. 8, 2012

(65) Prior Publication Data

US 2012/0200691 A1    Aug. 9, 2012

Related U.S. Application Data

(63) Continuation of application No. PCT/JP2010/065580, filed on Sep. 10, 2010.

(30) Foreign Application Priority Data

Sep. 11, 2009    (JP) ................................. 2009-209952

(51) Int. Cl.
*H04N 7/18* (2006.01)
*G02B 21/36* (2006.01)

(52) U.S. Cl.
CPC ................................... *G02B 21/367* (2013.01)

(58) Field of Classification Search
CPC .................................................... G02B 21/367
USPC ......................................................... 348/79
See application file for complete search history.

(56) References Cited

U.S. PATENT DOCUMENTS

| 7,355,702 B2 | 4/2008 | Yamashita et al. |
| 2005/0063611 A1 | 3/2005 | Toki et al. |
| 2006/0171582 A1 | 8/2006 | Eichhorn |

FOREIGN PATENT DOCUMENTS

| JP | 2003-195174 | 7/2003 |
| JP | 2005-24642 | 1/2005 |
| JP | 2006-3805 | 1/2006 |

OTHER PUBLICATIONS

International Search Report for International Application No. PCT/JP2010/065580 mailed Oct. 5, 2010.
Extended European Search Report issued Sep. 19, 2014 in corresponding European Patent Application No. 10815438.6.
Roman Durikovic et al."Shape-Based Calculation and Visualization of General Cross-sections through Biological Data", 1997 IEEE Conference. London, UK Aug. 27-29, 1997 and CA, USA Aug. 27, 1997, pp. 2-9.

*Primary Examiner* — Anner Holder
(74) *Attorney, Agent, or Firm* — Staas & Halsey LLP

(57) ABSTRACT

A microscope apparatus and control method. An image processing unit obtains an image on a plane observation cross-section inside a sample. A drive control unit controls a galvano-scanner and a z drive unit, and inclines the entire observation cross-section in a direction where the cross-section of an observation target that appears in the image becomes long. When an edge portion of the cross-section of the observation target is detected in the observation cross-section while gradually inclining the observation cross-section, the drive control unit uses an axis passing through the edge portion as the center to incline a part of the observation cross-section located on a side, where the cross-section of the observation target does not appear, from among the sides having this axis as a boundary, in a direction where the cross-section of the observation target appears, so as to form the observation cross-section having a profile which is folded.

20 Claims, 5 Drawing Sheets

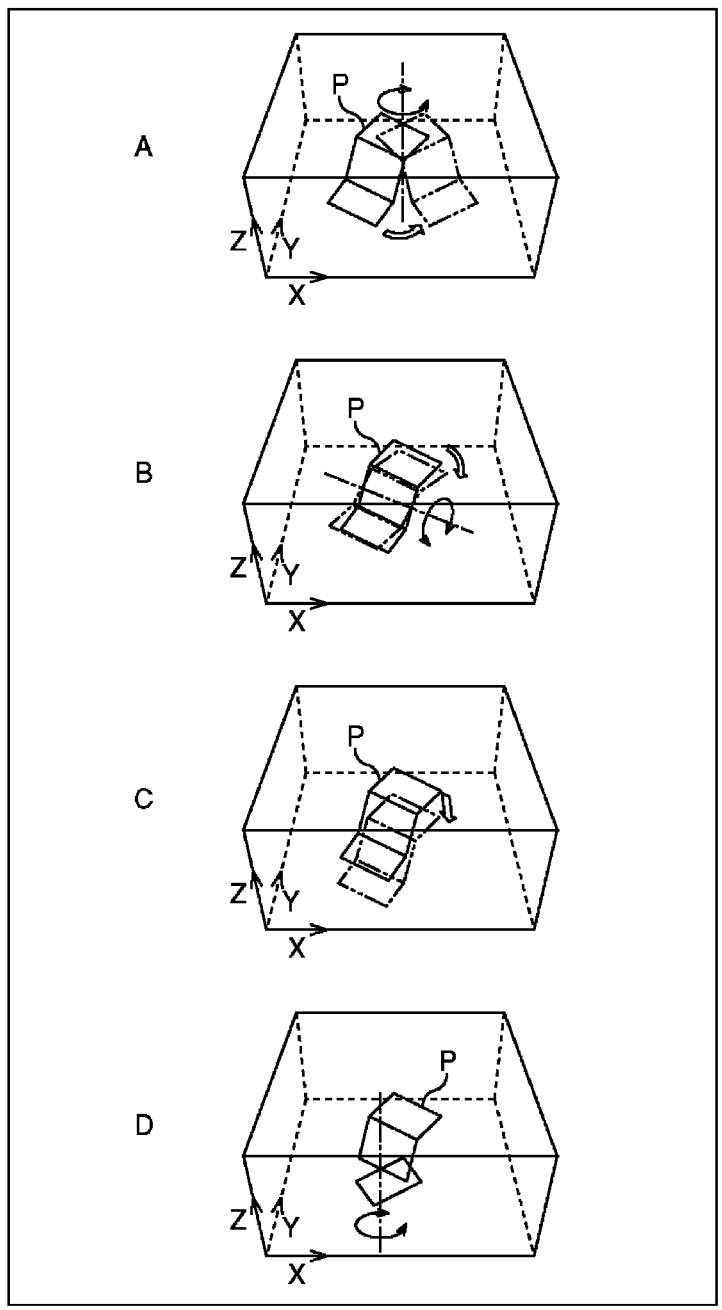

MICROSCOPE APPARATUS AND CONTROL METHOD

CROSS-REFERENCE TO RELATED APPLICATIONS

This is a continuing application, filed under 35 U.S.C. §111(a), of International Application PCT/JP2010/065580, filed Sep. 10, 2010, which claims priority benefit of Japanese Application No. 2009-209952, filed Sep. 11, 2009, of which the entire contents are incorporated herein.

TECHNICAL FIELD

The present invention relates to a microscope apparatus and a control method, and more particularly to a microscope apparatus and a control method that allow making observation efficient.

BACKGROUND ART

In observing a sample, such as a sliced cell and a nerve cell in vivo, an observation method which has been available captures a plurality of images of an observation cross-section on an XY plane, which is perpendicular to the optical axis, while changing the Z coordinate along the optical axis direction, and constructs a three-dimensional image of a rectangular parallelopiped area inside the sample by the image processing (volume rendering) to stack the plurality of images on the observation cross-section in the Z direction, so as to perform a stereoscopic observation of the sample. In such an observation method, the user determines a range of the three-dimensional image in the Z direction (Z stack), while observing the image of the observation cross-section on the XY plane in real-time, while adjusting the Z coordinate, for example.

For example, Patent Document 1 discloses an observation method for obtaining a three-dimensional image of a sample, specifying an area to execute light stimulation based on the three-dimensional image, and observing the change of the sample caused by the light stimulation.

A nerve cell has a structure of a nerve cell body from which dendrites extend, and depending on the orientation of the sample in the observation, dendrites are positioned in a vertical direction or in a downward diagonal direction. In this case, even if the user observes the image of the observation cross-section in the XY plane in real-time, dendrites are displayed merely as dots in each observation cross-section in an individual image, and it is difficult to know the general structure of the nerve cell merely by obtaining the images of the observation cross-sections.

To solve this problem, Patent Documents 2 and 3, example, disclose an observation method for grasping a general structure of an entire sample by obtaining a three-dimensional image thereof, specifying an observation area along the dendrites based on the three-dimensional image, and observing the observation area closely.

Patent Document 1: Japanese Patent Application Laid-Open No. 2006-3805
Patent Document 2: Japanese Patent Application Laid-Open No. 2005-24642
Patent Document 3: Japanese Patent Application Laid-Open No. 2003-195174

In the case of the above mentioned observation method for constructing a three-dimensional image of a rectangular parallelopiped area inside a sample to observe the sample, it takes time to execute the processing to capture images on a plurality of observation cross-sections and the processing to stack these images in the Z direction, therefore efficient observation is difficult.

DISCLOSURE OF THE INVENTION

With the foregoing in view, it is an object of the present invention to allow making observation efficiently.

A microscope apparatus of the present invention is a microscope apparatus for observing a sample, comprising: an image obtaining unit that obtains an image on a plane observation cross-section inside the sample; an inclining unit that inclines the entire observation cross-section based on at least one of a profile and a brightness value of a cross-section of an observation target which appears in the image; and a folding unit that specifies an edge portion of the cross-section of the observation target in the image obtained by inclining the observation cross-section by the inclining unit, and using an axis passing through the edge portion as a center to incline a part of the observation cross-section located on a side, where the cross-section of the observation target does not appear, from among the sides having the axis as a boundary, in a direction where the cross-section of the observation target appears, so as to form the observation cross-section having a profile which is folded along the axis.

A control method of the present invention is a method for controlling a microscope apparatus for observing a sample, comprising: an image obtaining step of obtaining an image on a plane observation cross-section inside the sample; an inclination step of inclining the entire observation cross-section based on at least one of a profile and a brightness value of a cross-section of an observation target which appears in the image; and a folding step of specifying an edge portion of the cross-section of the observation target in the image obtained by inclining the observation cross-section in the inclination step, and using an axis passing through the edge portion as a center to incline a part of the observation cross-section located on a side, where the cross-section of the observation target does not appear, from among the sides having the axis as a boundary, in a direction where the cross-section of the observation target appears, so as to form the observation cross-section having a profile which is folded along the axis.

According to the microscope apparatus and the control method of the present invention, an image on a plane observation cross-section inside a sample is obtained, and based on at least one of a profile and a brightness value of the cross-section of the observation target which appears in the image, the entire observation cross-section is inclined. Then an edge portion of the cross-section of the observation target is specified in the image obtained by inclining the observation cross-section, and using an axis passing through the edge portion as a center, a part of the observation cross-section located on a side, where the cross-section of the observation target does not appear, from among the sides having the axis as a boundary, is inclined in a direction where the cross-section of the observation target appears, so as to form the observation cross-section having a profile which is folded along the axis. Therefore the observation target can be stereoscopically observed by the observation cross-section having a profile which is folded along the form of the observation target, and as a result, the processing to stack a plurality of images is unnecessary, and observation can be performed efficiently.

According to the microscope apparatus and the method for controlling the microscope apparatus of the present invention, observation can be performed efficiently.

BRIEF DESCRIPTION OF THE DRAWINGS

FIG. 5 is a diagram depicting an operation for the folded observation cross-section.

BEST MODE FOR CARRYING OUT THE INVENTION

Embodiments of the present invention will now be described in detail with reference to the drawings.

Figure 1:
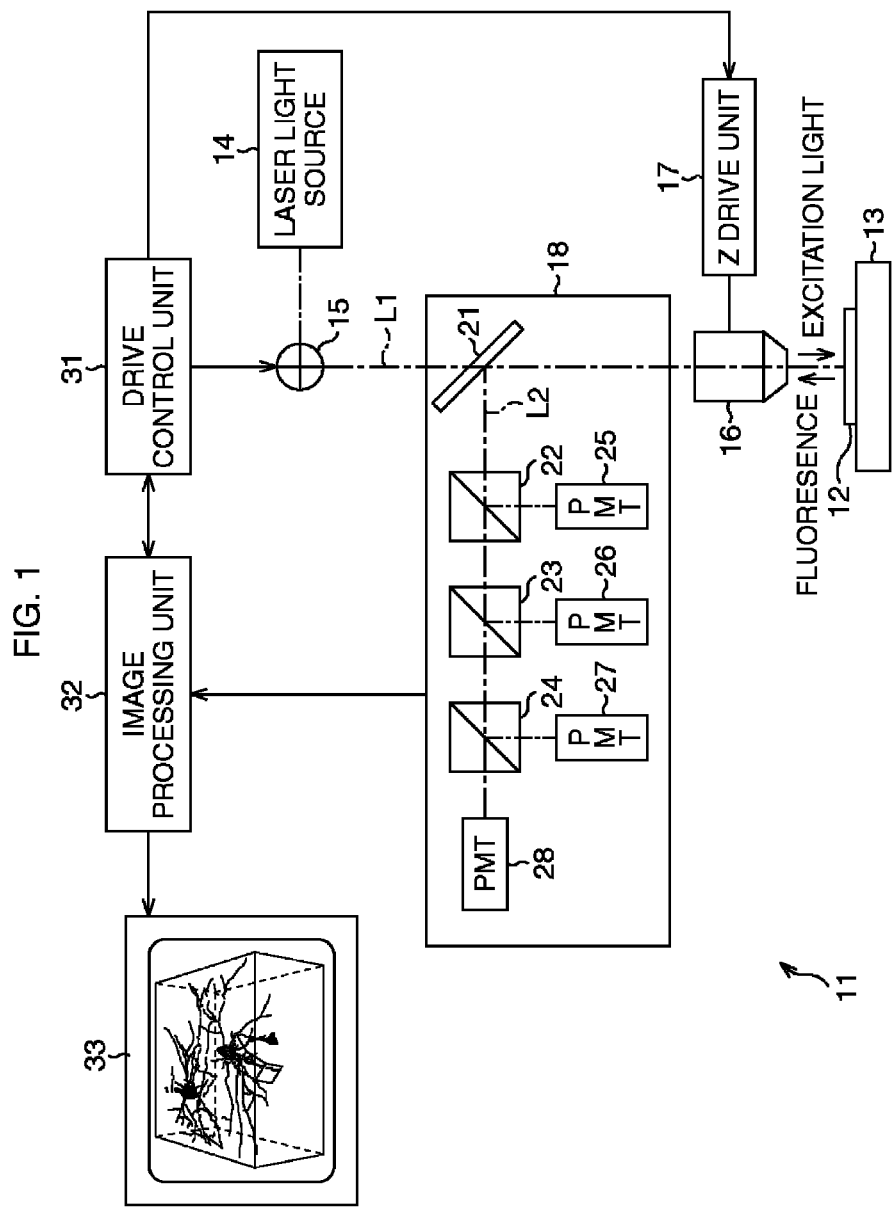
FIG. 1 is a block diagram depicting a configuration example of an embodiment of a microscope apparatus to which the present invention is applied.

FIG. 1 is a block diagram depicting a configuration example of an embodiment of the microscope apparatus to which the present invention is applied.

In the microscope apparatus 11, a sample 12 to be observed is placed on a stage 13, and fluorescent components included in the sample 12 are excited by irradiating the excitation light onto the sample 12. Then fluorescence (observation light) emitted from the sample 12 is detected, and the image data of the sample 12 is constructed based on the fluorescence.

A laser light source 14 emits the excitation light having a wavelength corresponding to the characteristic of the fluorescent reagent used for coloring the sample 12. For the laser light source 14, an ultrashort pulse laser light source that can emit ultrashort pulsed light, which is a pulsed laser beam of which time width is very short (e.g. 100 femtoseconds), can be used, and in the microscope apparatus 11, the ultrashort pulse laser beam is used as the excitation light.

A galvano-scanner 15 reflects the excitation light, emitted from the laser light source 14, along the optical axis L1 directed to the sample 12. The galvano-scanner 15 also has two mirrors, which are driven according to the control by the drive control unit 31, and scans the excitation light, which is directed to the sample 12 along the optical axis L1, in the direction perpendicular to the optical axis L1, by driving these mirrors.

An objective lens 16 collects the excitation light which enters along the optical axis L1, and forms a spot in a predetermined location inside the sample 12. As mentioned above, the ultrashort pulse laser light source is used as the excitation light, and fluorescence is emitted only in the spot of the sample 12, due to the multi-photon excitation by the excitation light. As a result, excitation in an extremely localized range becomes possible.

A Z drive unit 17 drives the objective lens 16 in the optical axis direction according to the control of the drive control unit 31, and moves the spot formed by the objective lens 16 in the optical axis direction. For example, the Z drive unit 17 is constituted by a piezo element, and can drive the objective lens 16 at a fast speed.

Thus according to the microscope apparatus 11, a spot is scanned by the galvano-scanner 15 in the direction perpendicular to the optical axis (hereafter called "X direction" or "Y direction"), and the spot is moved in the optical axis direction (hereafter called "Z direction") by the Z drive unit 17, according to the control of the drive control unit 31.

By properly controlling the moving speed of the objective lens 16 in the Z direction with respect to the scanning speed of the spot in the X and Y directions, the drive control unit 31 can scan the spot on a plane perpendicular to the axis, which is inclined from the optical axis L1. For example, a technology to obtain a fragment image, which is perpendicular to an axis inclined from the optical axis, is disclosed in Japanese Patent Application Laid-Open No. H10-161034, which is applied by the present applicant.

The fluorescence emitted from the spot in the sample 12 enters a detection unit 18, which is disposed between the galvano-scanner 15 and the objective lens 16, via the objective lens 16.

The detection unit 18 is a detector which detects fluorescence emitted from a spot to be scanned in the sample 12 without performing de-scanning (a non-descanned detector), and comprises four dichroic mirrors 21 to 24 and four PMTs (Photo Multipliers) 25 to 28.

The dichroic mirrors 21 to 24 are mirrors which reflect only light in a predetermined wavelength range, and which transmit light in another wavelength range, and the dichroic mirror 21 is disposed on the optical axis L1, and the dichroic mirrors 22 to 24 are disposed in line on the optical axis L2, which is approximately perpendicular to the optical axis L1.

The dichroic mirror 21 transmits the excitation light which travels from the galvano-scanner 15 to the objective lens 16 along the optical axis L1, and reflects the fluorescence, which enters via the objective lens 16, along the optical axis L2, which is approximately perpendicular to the optical axis L1.

The dichroic mirrors 22 to 24 reflect fluorescence in the respective corresponding wavelength range. The fluorescence reflected by the dichroic mirror 22 enters a PMT 25, the fluorescence transmitted through the dichroic mirror 22 and reflected by the dichroic mirror 23 enters a PMT 26, the fluorescence transmitted through the dichroic mirror 22 and 23 and reflected by the dichroic mirror 24 enters a PMT 27, and the fluorescence transmitted through the dichroic mirrors 22 to 24 enters a PMT 28.

The PMTs 25 to 28 detect the respective fluorescence that enters, perform photoelectric conversion, and supply a voltage detection signal according to the quantity of light of the received fluorescence (brightness of fluorescence) to an image processing unit 32.

The image processing unit 32 performs image processing for each of the detection signals supplied from the PMTs 25 to 28, so as to construct the images based on the position of the spot according to the control of the drive control unit 31, generates an image based on the quantity of light of the fluorescence in each wavelength region received by the PMTs 25 to 28, and displays the image on the display unit 33.

For example, the image processing unit 32 can construct a three-dimensional image of a rectangular parallelopiped area inside the sample 12 by the image processing to stack images of the observation cross-sections of the sample 12, sliced perpendicular to the optical axis L1, in the optical axis L1 direction.

In the microscope apparatus 11, images of the observation cross-sections which are perpendicular to an axis inclined from the optical axis L1 can also be obtained, and by combining a plurality of observation cross-sections of which angle of inclinations are all different, an image of a stereoscopic plane, formed as if the plane is folded, (hereafter called "folded observation cross-section") can be obtained.

The folded observation cross-section will now be described with reference to FIG. 2.

Figure 2:
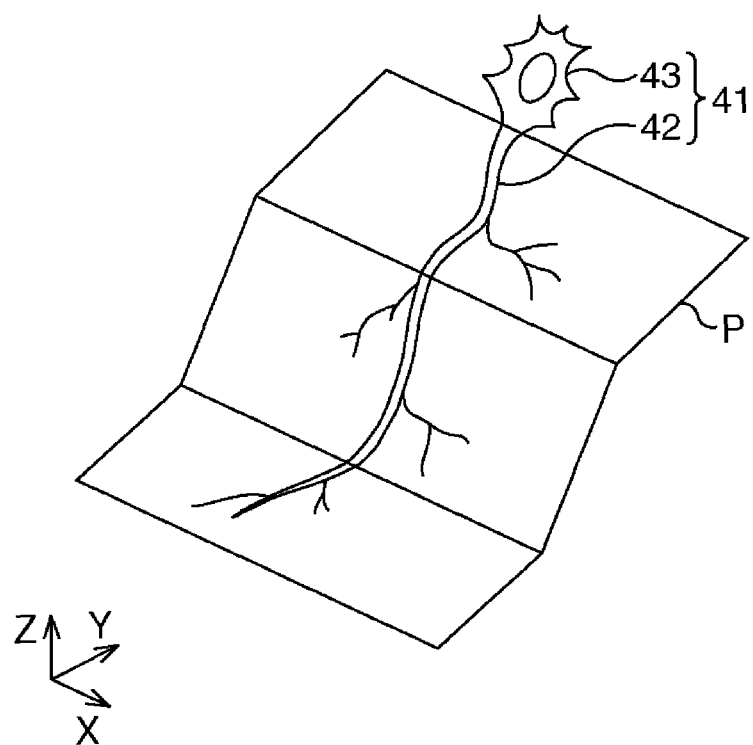
FIG. 2 is a diagram depicting a folded observation cross-section.

Generally a nerve cell 41 is constituted by a nerve cell body 43, from which dendrites 42 extend in a curved shape, branching like tree branches as shown in FIG. 2. In the microscope apparatus 11, an image P on the folded observation cross-section can be obtained by scanning a spot along the folded observation cross-section, which is folded according to the curving shape of a dendrite 42.

Figure 3:
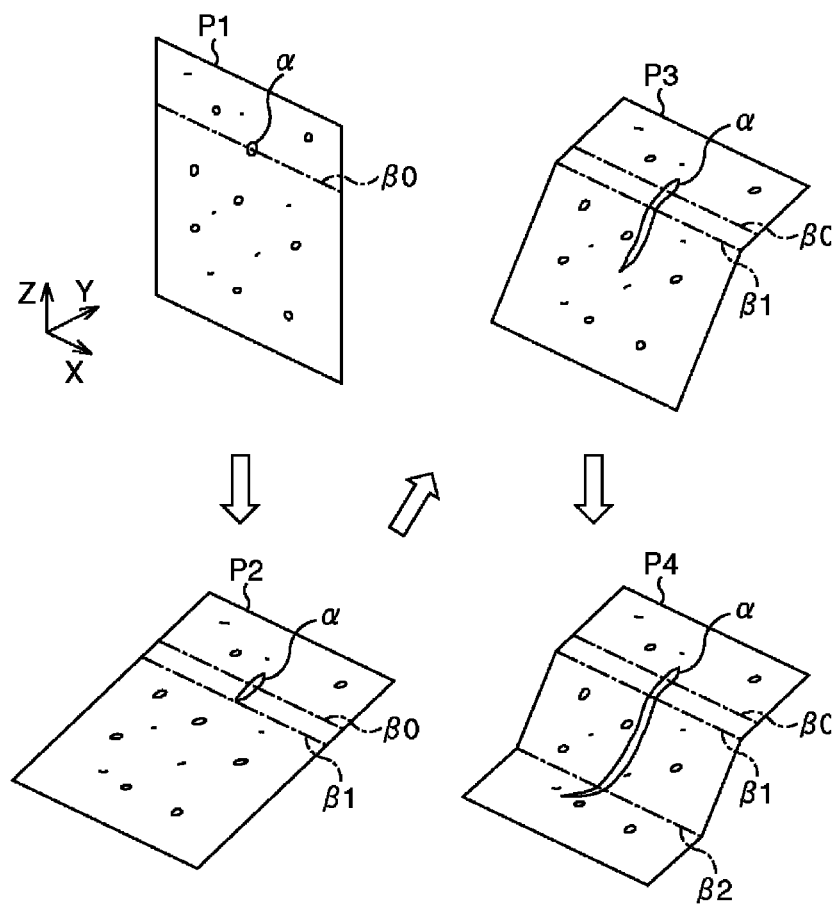
FIG. 3 is a diagram depicting an image obtaining method for obtaining an image of the folded observation cross-section.

Now an image obtaining method for obtaining the image P of the folded observation cross-section will be described with reference to FIG. 3.

First the microscope apparatus 11 obtains an image P1 on a plane observation cross-section (XZ plane), which is perpendicular to the Y axis. In other words, every time the drive control unit 31 controls the galvano-scanner 15 to scan a spot for one line in the X direction, the drive control unit 31 controls the Z drive unit 17 to move the scanning line in the Z direction, whereby the spot is scanned along the observation cross-section, which is perpendicular to the Y axis, and the image P1 on the observation cross-section is obtained by the image processing unit 32. In this case, the image P1, on which a plurality of cross-sections of dendrites are scattered, is displayed, as shown in FIG. 3.

Then the user specifies the observation target dendrite $\alpha$ out of the plurality of dendrites displayed in the image P1. Thereby the drive control unit 31 specifies the axis extending in the X direction at a depth in the Z direction where the dendrite $\alpha$ is detected, as the center axis $\beta 0$, which becomes the center when the observation cross-section is inclined.

Then the drive control unit 31 performs processing to incline the entire observation cross-section using the center axis $\beta 0$ as the center. For example, if the moving speed to move the scanning line, where the spot is scanned in the X direction, in the Y direction is the same as the moving speed to move the scanning line in the Z direction, then the inclination angle of the observation cross-section with respect to the XY plane is 45°. If the moving speed to move the scanning line, where the spot is scanned in the X direction, in the Y direction is slower than the moving speed to move the scanning line in the Z direction, then the inclination angle of the observation cross-section with respect to the XY plane increases, and if the moving speed to move the scanning line, where the spot is scanned in the X direction, in the Y direction is faster than the moving speed to move the scanning line in the Z direction, then the inclination angle with respect to the XY plane decreases.

At this time, the user slightly inclines the observation cross-section in both the left and right directions using the center axis $\beta 0$ as the center, for example, and determines the direction to incline the observation cross-section to the direction in which the cross-section of the dendrite $\alpha$ extends longer. In other words, as illustrated in FIG. 2, the dendrite has a long shape extending in a predetermined direction, and if the cross-section of the dendrite is close to a circle in the observation cross-section, this means that the observation cross-section is perpendicular to the dendrite, and if the cross-section of the dendrite has a long shape in the observation cross-section, then this means that the observation cross-section is along the dendrite. Therefore the observation cross-section is positioned to be along the dendrite by inclining the observation cross-section in a direction for the cross-section of the dendrite $\alpha$ to be longer.

The drive control unit 31 gradually inclines the observation cross-section a micro-angle at a time, using the center axis $\beta 0$ as the center, and the user observes the image which changes according to the inclination of the observation cross-section, and allows the observation cross-section to incline until the angle at which the cross-sectional profile of the dendrite $\alpha$ becomes the longest, and obtains the image P2 of the observation cross-section.

Then the drive control unit 31 specifies the center axis $\beta 1$, which extends in the X direction at the edge portion of the dendrite $\alpha$ detected on the observation cross-section, and folds the observation cross-section with respect to the center axis $\beta 1$ as the boundary. In other words, the drive control unit 31 inclines a part of the observation cross-section on the front end side of the edge portion of the dendrite $\alpha$ in the image P2 of the observation cross-section (a part of the observation cross-section on the side, where the dendrite $\alpha$ does not appear, from among the sides having the center axis $\beta 1$ as the boundary), using the center axis $\beta 1$ as the center. In this case, the drive control unit 31 maintains the observation cross-section on the rear end side (observation cross-section on the side, where the dendrite $\alpha$ appears, from among the sides having the center axis $\beta 1$ as the boundary) in the same state.

At this time, the user slightly inclines the observation cross-section on the front end side in both the left and right directions using the center axis $\beta 1$ as the center, for example, and determines the direction to incline the observation cross-section on the front end side of the center axis $\beta 1$ to the direction in which the rest of the dendrite $\alpha$ appeared in the image P2 emerges.

By inclining the observation cross-section on the front end side of the center axis $\beta 1$ like this, the image P3 of the folded observation cross-section, which is folded along the center axis $\beta 1$, is obtained.

Then the drive control unit 31 inclines the observation cross-section on the front end side using the center axis $\beta 1$ as the center, up to the angle at which the cross-sectional profile of the dendrite $\alpha$ becomes longest, and specifies the center axis $\beta 2$, which extends in the X direction at the edge portion of the dendrite $\alpha$ detected on the observation cross-section on the front end side. Then the observation cross-section on the front end side is further folded with the center axis $\beta 2$ as the boundary. Thereby an image P4 of the folded observation cross-section, which is folded along the center axes $\beta 1$ and $\beta 2$, is obtained.

By repeating the processing to incline the observation cross-section on the front end side of the rotation axis using the rotation axis passing through the edge portion when the dendrite $\alpha$ is longest, an image of the folded observation cross-section, which is folded at a plurality of sections along the dendrite $\alpha$, is obtained.

The image processing unit 32 may perform an image processing to determine an area of each dendrite displayed in the image P1, for example, and specify a dendrite of which sectional area is largest, that is, a thickest dendrite, as the observation target, and notify this dendrite $\alpha$ to the drive control unit 31. If the image processing unit 32 performs an image processing to recognize the cross-sectional profile of a dendrite which appears in the image P2, gradually inclines the observation cross-section a micro angle at a time according to the control of the drive control unit 31, and compares the cross-sectional profiles of the dendrite before and after the inclination, then the inclination angle at which the cross-sectional profile of the dendrite becomes longest can be determined.

Figure 4:
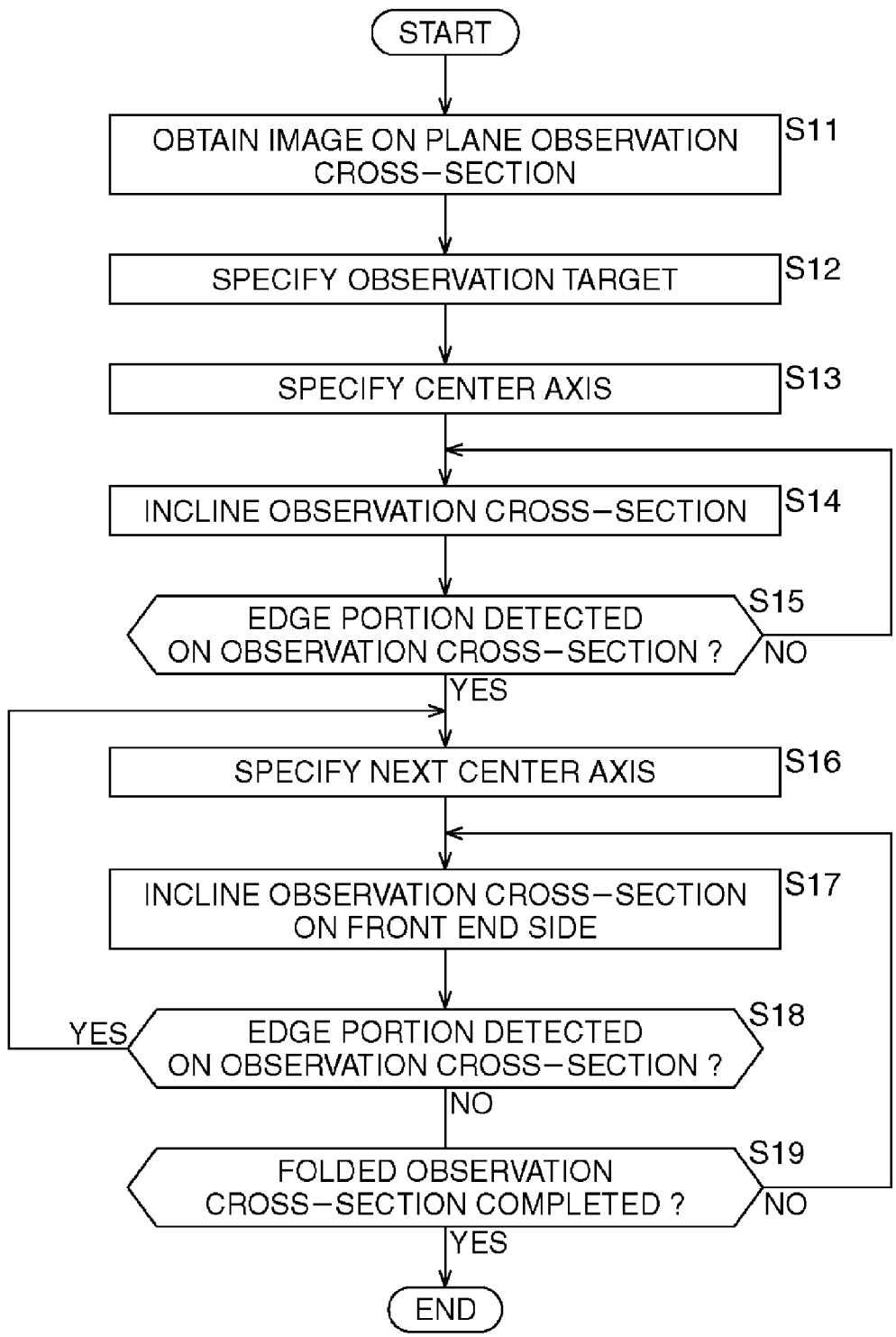
FIG. 4 is a flow chart depicting the processing for the microscope apparatus to obtain an image of the folded observation cross-section.

FIG. 4 is a flow chart depicting the processing for the microscope apparatus 11 shown in FIG. 1 to obtain an image of the folded observation cross-section.

For example, if the user places a sample 12 on the stage 13 and performs an operation to start processing, the processing is started, and an image of an observation cross-section on the XZ plane perpendicular to the Y axis (image P1 in FIG. 3) is obtained in step S11, and processing advances to step S12.

In step S12, the image processing unit 32 performs image processing to determine the area of each dendrite displayed in the image obtained in step S11, specifies a dendrite having the largest area as the observation target, and processing advances to step S13.

In step S13, the drive control unit 31 specifies the center axis to an axis which extends in the X direction at the depth in the Z direction at the center of the dendrite specified in step S12, and processing advances to step S14.

In step S14, the drive control unit 31 inclines the observation cross-section at a predetermined angle in the direction in which the cross-sectional profile of the dendrite becomes longer, using the center axis specified in step S13 as the center, and obtains the image of the observation cross-section after the inclination, and processing advances to step S15.

In step S15, the image processing unit 32 performs image processing to recognize the cross-sectional profile of the dendrite which appears in the image obtained in step S14, and determines whether or not the edge portion of the observation target dendrite is detected in the observation cross-section. If it is determined that the edge portion of the observation target dendrite is not detected in the observation cross-section, processing returns to step S14, and the processing to obtain the image is repeated with further inclining the observation cross-section at a predetermined angle.

In this way, according to the microscope apparatus 11, if the edge portion of the observation target dendrite is not detected in the observation cross-section, images are sequentially obtained by inclining the observation cross-section at a predetermined angle at a time, so that the cross-sectional profile of the dendrite becomes longer, and the image processing unit 32 sequentially recognizes the cross-sectional profile of the dendrite in each of these images, and compares the images before and after the inclination. Then the image processing unit 32 detects the front end of the dendrite in the observation cross-section immediately before the cross-sectional profile of the dendrite when the length decreased after reaching the maximum length, as the edge portion of the dendrite on the observation cross-section.

If it is determined that the image processing unit 32 detected the edge portion of the dendrite of the observation target on the observation cross-section in step S15, processing advances to step S16.

In step S16, the drive control unit 31 specifies an axis extending in the X direction, with the depth in the Z direction at the edge portion of the dendrite detected in step S15, as the next center axis, and processing advances to step S17.

In step S17, using the center axis specified in step S16 as the center, the drive control unit 31 inclines the observation cross-section on the front end side of the rotation axis in the direction where the cross-sectional profile of the dendrite becomes longer. Then the image processing unit 32 obtains an image on the observation cross-section after the inclination, and processing advances to step S18.

In step S18, the image processing unit 32 determines whether the edge portion of the observation target dendrite was detected in the observation cross-section on the front end side, just like the processing in step S15.

If the image processing unit 32 determined that the edge of the observation target dendrite was detected in the observation cross-section on the front end side in step S18, processing returns to step S16, and the same processing is repeated hereafter.

On the other hand, if the image processing unit 32 determined that the edge portion of the observation target dendrite was not detected in the observation cross-section on the front end side in step S18, processing advances to step S19.

In step S19, the image processing unit 32 determines whether the folded observation cross-section is completed. For example, if the edge portion of the observation target dendrite is not detected even after the determination processing step S18 is repeated for a predetermined number of times, the image processing unit 32 regards the edge portion at this moment as the front end of the dendrite, and determines that the folded observation cross-section is completed. If a number of times of folding the observation cross-section is set, it is determined that the folded observation cross-section is completed when the observation cross-section is folded for this number of times.

If the image processing unit 32 determined that the folded observation cross-section is not completed in step S19, processing returns to step S17, and the same processing is repeated hereafter, and if it is determined that the folded observation cross-section is completed, processing ends.

As described above, according to the microscope apparatus 11, an image on the observation cross-section along the dendrite can be obtained by generating the folded observation cross-section which is folded at a plurality of sections along the dendrite. As a result, the profile of the dendrite can be observed three-dimensionally.

Here processing to incline the observation cross-section in a direction where the cross-section of the dendrite becomes longer is performed, as mentioned above, and as a reference to determine the length, a major axis of an ellipse circumscribing the observation target dendrite displayed in the image, or a length of a diagonal of a rectangle circumscribing the dendrite, can be used, for example. In other words, an image of the observation cross-section when the major axis of the ellipse becomes longest, or an image of the observation cross-section when the length of the diagonal of the rectangle becomes longest, is the image of the folded observation cross-section. Examples of a way of determining this length are: the user visually looks at the image and determines the longest; calculate the length by image processing and the user determines the longer length based on the length displayed on the display unit; and the image processing unit calculates the length and determines the longest length based on the comparison processing (automatic determination processing).

In the present embodiment, the observation cross-section is inclined in a direction where the cross-section of the dendrite becomes longer, but the present invention is not limited to this, and the observation cross-section may be inclined in a direction where the average brightness value of the image increases, and in this case, an image of the observation cross-section of which average brightness value is highest becomes an image of the folded observation cross-section. The observation cross-section may also be inclined in a direction where the brightness value of a target pixel increases, and in this case, the image of which brightness value of the target pixel is highest becomes an image of the folded observation cross-section. Examples of a way of determining the average brightness value or brightness value of a target pixel of an image are: the user visually looks at the image and determines the highest brightness; calculates the average brightness value or the brightness value of the target pixel of the image, and the user determines the highest brightness based on the average brightness value or the brightness value displayed on the display unit; and the image processing unit calculates the average brightness value or the brightness value and determines the highest brightness based on the comparison processing (automatic determination processing).

Conventionally, the stereoscopic structure of a dendrite is observed by capturing a plurality of images of the observation cross-sections perpendicular to the optical axis, while changing the coordinate in the optical axis direction, and performing image processing to stack the plurality of images in the optical axis direction (volume rendering). In the case of the microscope apparatus 11, on the other hand, the stereoscopic structure of a dendrite can be observed by the folded observation cross-section, without performing such an image processing, therefore time required for the observation can be decreased, and the nerve cells can be observed efficiently. Furthermore, quantity of excitation light irradiated onto the sample 12 can be decreased, hence deterioration of the sample 12 can be minimized.

The drive control unit 31 can store the three-dimensional profile of the folded observation cross-section, and the folded observation cross-section can be moved while maintaining the profile, after the folded observation cross-section is completed.

For example, the folded observation cross-section P can be rotated around the axis in the Z direction while maintaining the profile thereof as illustrated in A of FIG. 5, or the folded observation cross-section P can be rotated around the axis along the XY direction while maintaining the profile thereof as illustrated in B of FIG. 5, or the folded observation cross-section P can be parallel-shifted while maintaining the profile thereof as illustrated in C of FIG. 5.

Thereby the peripheral area of the dendrite can be observed while maintaining the profile along the dendrite, as the observation target. Generally in a sample 12, a plurality of nerve cells are disposed in a same direction with a predetermined distance, therefore if the folded observation cross-section P is parallel-shifted while maintaining the profile thereof, an adjacent nerve cell located with a predetermined distance can be observed easily after one nerve cell is observed.

Further, as illustrated in C of FIG. 5, when a plurality of images of a folded observation cross-section are obtained with a predetermined interval when the folded observation cross-section P is parallel-shifted while maintaining the profile thereof, from the folded observation cross-section before the shift to the folded observation cross-section after the shift, and image processing to stack these images in the shifting direction is performed, then an image of a stereoscopic area, which has the profile of the folded observation cross-section with thickness, can be obtained. Thereby the image of the stereoscopic area required for observation can be obtained efficiently.

Furthermore, for example, only a partial plane of the folded observation cross-section P can be rotated. For example, only a part of the folded observation cross-section P on the front end side can be rotated around the axis in the Z direction, as illustrated in D of FIG. 5. Thereby even if the rest of the dendrite cannot be detected by inclining the front end side using the axis in the folded observation cross-section P as a center, for example, the detection range can be expanded by this rotation, and the rest of the dendrite may be detected.

According to the present embodiment, the spot formed in the sample 12 is scanned in the Z direction by driving the objective lens 16, but critical here is to relatively adjust the distance between the objective lens 16 and the sample 12, therefore the sample 12 may be moved with respect to the objective lens 16, for example, by fixing the objective lens 16 and driving the stage 13 using a drive unit (not illustrated) for driving the stage 13 in the Z direction.

Each processing described with reference to the above flow chart need not be processed in a time series according to the sequence depicted in the flow chart, and processings executed in parallel or independently (e.g. parallel processing or processing by object) can be included.

Embodiments of the present invention are not limited to the above mentioned embodiment, but numerous modifications can be made without departing from the true spirit and scope of the present invention.

DESCRIPTION OF THE REFERENCE NUMERALS 11 microscope apparatus
12 sample
13 stage
14 laser light source
15 galvano-scanner
16 objective lens
17 Z drive unit
18 detection unit
21 to 24 dichroic mirror
25 to 28 PMT
31 drive control unit
32 image processing unit
33 display unit
41 nerve cell
42 dendrite
43 nerve cell body

The invention claimed is:

1. A microscope apparatus for observing a sample, comprising:
    an image obtaining unit that obtains an image on a plane observation cross-section inside the sample;
    an inclining unit that inclines the entire observation cross-section based on at least one of a profile and a brightness value of a cross-section of an observation target which appears in the image; and
    a folding unit that specifies an edge portion of the cross-section of the observation target in the image obtained by inclining the observation cross-section by the inclining unit, and using an axis passing through the edge portion as a center to incline a part of the observation cross-section located on a side, where the cross-section of the observation target does not appear, from among the sides having the axis as a boundary, in a direction where the cross-section of the observation target appears, so as to form the observation cross-section having a profile which is folded along the axis.

2. The microscope apparatus according to claim 1, wherein when an edge portion of the cross-section of the observation target is newly specified in the part of the observation cross-section on the side inclined in the direction where the cross-section of the observation target appears, the folding unit further inclines a part of the observation cross-section using an axis passing through the newly detected edge portion as a center.

3. The microscope apparatus according to claim 1, wherein the image obtaining unit obtains a plurality of images on the folded observation cross-section by rotating or parallel-shifting the folded observation cross-section, while maintaining the profile of the folded observation cross-section formed by the folding unit.

4. The microscope apparatus according to claim 1, wherein the inclining direction based on the profile of the cross-section is a direction in which the profile becomes longest.

5. The microscope apparatus according to claim 1, wherein the inclining direction based on the brightness value of the cross-section is a direction in which the brightness values becomes highest.

6. A method for controlling a microscope apparatus for observing a sample, comprising:
   an image obtaining step of obtaining an image on a plane observation cross-section inside the sample;
   an inclination step of inclining the entire observation cross-section based on at least one of a profile and a brightness value of a cross-section of an observation target which appears in the image; and
   a folding step of specifying an edge portion of the cross-section of the observation target in the image obtained by inclining the observation cross-section in the inclination step, and using an axis passing through the edge portion as a center to incline a part of the observation cross-section located on a side, where the cross-section of the observation target does not appear, from among the sides having the axis as a boundary, in a direction where the cross-section of the observation target appears, so as to form the observation cross-section having a profile which is folded along the axis.

7. The control method according to claim 6, wherein
   in the folding step, when an edge portion of the cross-section of the observation target is newly specified in the part of the observation cross-section on the side inclined in the direction where the cross-section of the observation target appears, a part of the observation cross-section is further inclined using an axis passing through the newly detected edge portion as a center.

8. The control method according to claim 6, wherein
   a plurality of images on the folded observation cross-section are obtained in the image obtaining step, by rotating or parallel-shifting the folded observation cross-section, while maintaining the profile of the folded observation cross-section formed in the folding step.

9. The control method according to claim 6, wherein
   the inclining direction based on the profile of the cross-section is a direction in which the profile becomes longest.

10. The control method according to claim 6, wherein
    the inclining direction based on the brightness value of the cross-section is a direction in which the brightness value becomes highest.

11. The microscope apparatus according to claim 2, wherein
    the image obtaining unit obtains a plurality of images on the folded observation cross-section by rotating or parallel-shifting the folded observation cross-section, while maintaining the profile of the folded observation cross-section formed by the folding unit.

12. The microscope apparatus according to claim 2, wherein
    the inclining direction based on the profile of the cross-section is a direction in which the profile becomes longest.

13. The microscope apparatus according to claim 3, wherein
    the inclining direction based on the profile of the cross-section is a direction in which the profile becomes longest.

14. The microscope apparatus according to claim 2, wherein
    the inclining direction based on the brightness value of the cross-section is a direction in which the brightness values becomes highest.

15. The microscope apparatus according to claim 3, wherein
    the inclining direction based on the brightness value of the cross-section is a direction in which the brightness values becomes highest.

16. The control method according to claim 7, wherein
    a plurality of images on the folded observation cross-section are obtained in the image obtaining step, by rotating or parallel-shifting the folded observation cross-section, while maintaining the profile of the folded observation cross-section formed in the folding step.

17. The control method according to claim 7, wherein
    the inclining direction based on the profile of the cross-section is a direction in which the profile becomes longest.

18. The control method according to claim 8, wherein
    the inclining direction based on the profile of the cross-section is a direction in which the profile becomes longest.

19. The control method according to claim 7, wherein
    the inclining direction based on the brightness value of the cross-section is a direction in which the brightness value becomes highest.

20. The control method according to claim 8, wherein
    the inclining direction based on the brightness value of the cross-section is a direction in which the brightness value becomes highest.

* * * * *